3,107,158
METHOD FOR THE MANUFACTURE OF PIPES OF CONCRETE HAVING PRESTRESSED LONGITUDINAL AND ANNULAR REINFORCEMENTS

Anders Emrik August Ahlberg, Malmo, Sweden, assignor to Svenska Entreprenad Aktiebolaget, Sentab and Aktiebolaget Skanska Cementgjuteriet, Stockholm, Sweden, both corporations of Sweden, and Hojgaard & Schultz A/S, Copenhagen, Denmark, a corporation of Denmark
Filed Feb. 6, 1961, Ser. No. 87,118
Claims priority, application Sweden Feb. 24, 1960
1 Claim. (Cl. 25—154)

This invention relates to a method for the manufacture of pipes of concrete having prestressed longitudinal and annular reinforcements by the use of a mold assembly comprising an expansible outer mold and an inner mold provided with or consisting of an expansible sleeve, the concrete, after it has been introduced and packed together in the mold assembly, being compressed radially against the outer mold by expansion of said inner mold sleeve under a fluid pressure applied to the inside of said sleeve, and when so compressed the concrete imparting prestress to the annular reinforcement which has been placed in advance in the outer mold.

It is an object of the invention to provide an improved method for the manufacture of concrete pipes having prestressed reinforcements by the use of mold assemblies which comprise an expansible outer mold and a flexible inner mold sleeve between which the concrete is compressed.

It is a specific object of the invention to provide an improved method for the manufacture of concrete pipes having prestressed reinforcements by the use of a mold assembly of the type described in U.S. Patent No. 2,865,078, granted to E. D. V. Hasselblad, which will permit the manufacture of pipes of higher quality as well as a reduction of the manufacturing costs.

Figure 1:
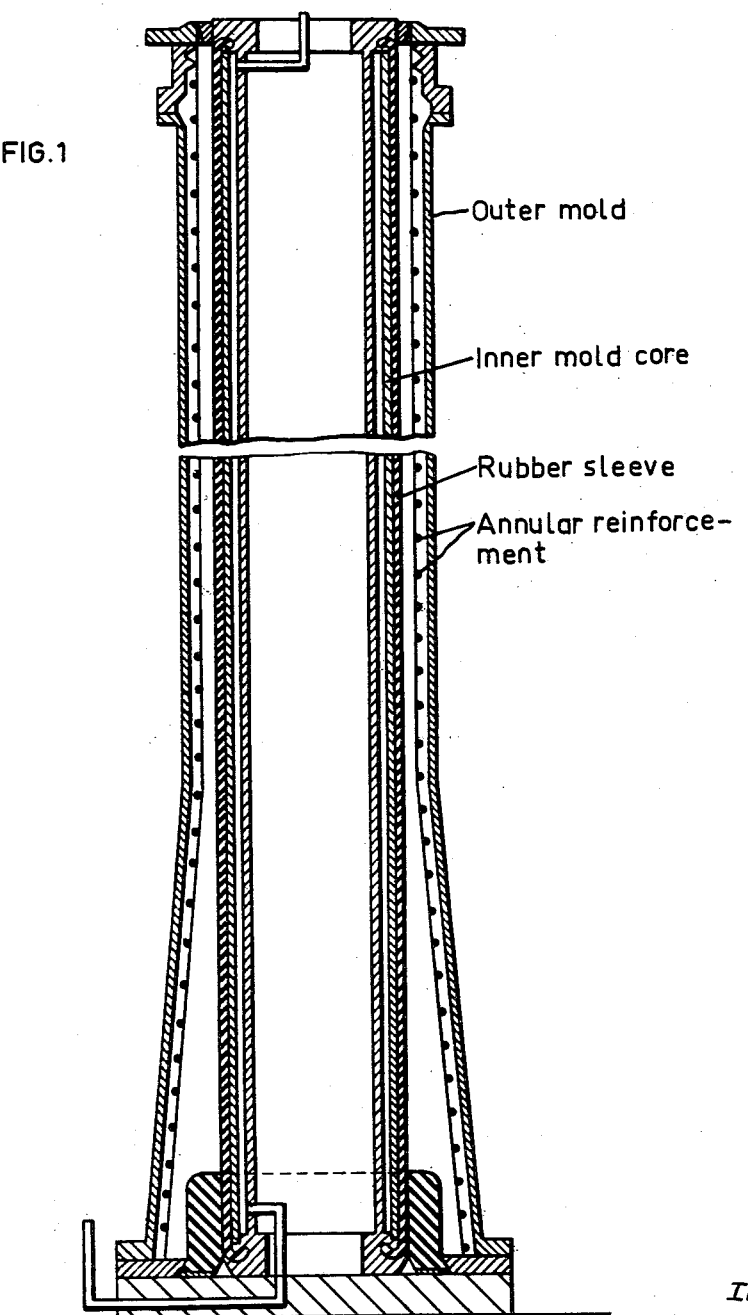
Figure 2:
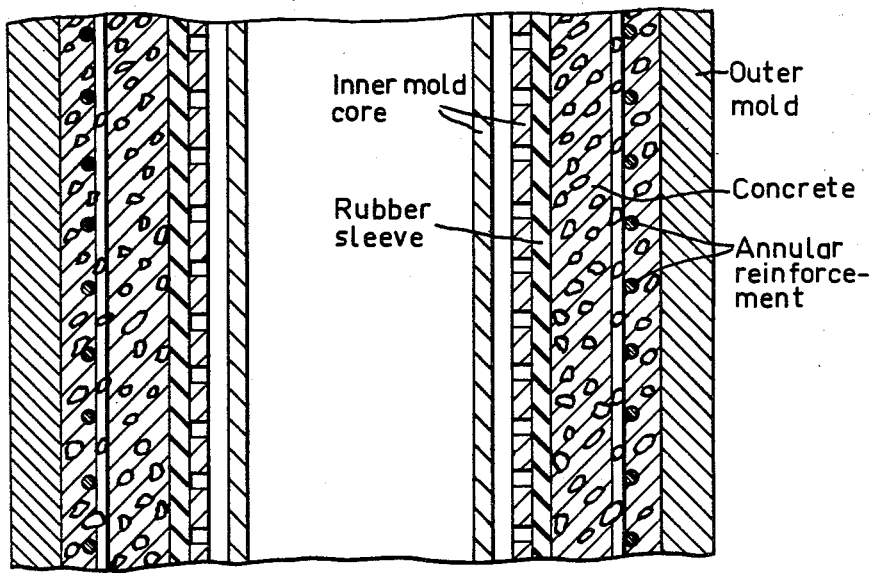
Figure 3:
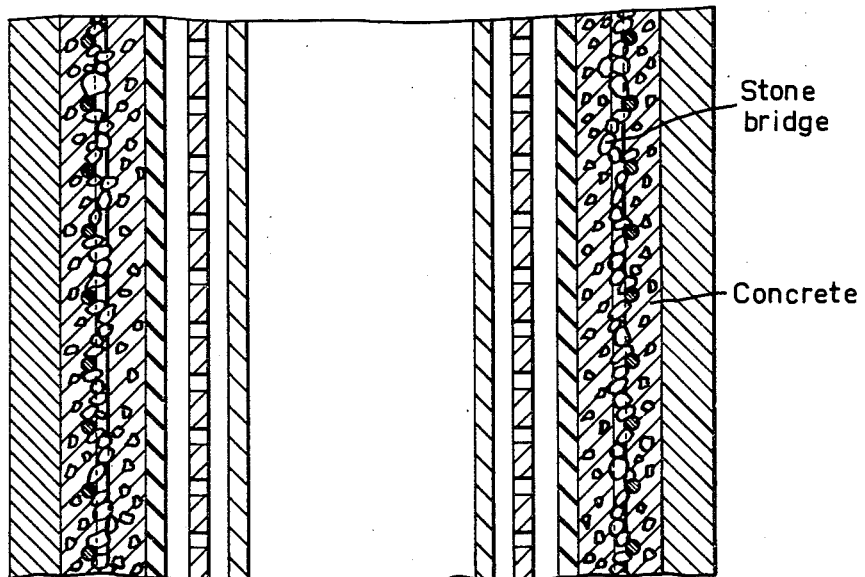

FIGURE 1 is a sectional view of a mold with which the method according to the invention can be used; FIGURES 2 and 3 are fractional views in longitudinal section illustrating two stages in the manufacture of prestressed concrete pipes by a method of the kind improved by the present invention.

The method as hitherto practised for the manufacture of concrete pipes having prestressed reinforcements by the use of the mold assembly according to U.S. Patent No. 2,865,078 is briefly as follows. In a two-part or four-part outer mold of sheet steel, the parts of which are held together by resilient boltings, there is provided a cage of annular reinforcement rods and longitudinal reinforcement rods, which latter are prestressed to the desired extent in the outer mold. The outer mold and the cage of reinforcement rods is passed onto a vertical, substantially rigid inner mold which preferably has a double-walled jacket and is surrounded by a rubber sleeve which is snugly clamped to the ends of the inner mold and which can be expanded by the pressure of a fluid (e.g. water) which is supplied between the outer jacket wall of the inner mold and the rubber sleeve through holes in said outer jacket wall. Casting of a concrete pipe then takes place by introducing concrete mass between the outer and inner molds simultaneously as the mold assembly is vibrated by means of some suitable vibrating means, for instance vibrators placed on the outside of the outer mold. The vibration causes the concrete mass to flow between the annular reinforcement rods, thereby forming a dense, compacted concrete wall. After termination of the concrete casting operation a sealing ring is placed at the upper end of the mold assembly. Water under successively and slowly increasing pressure is now supplied to the double-walled inner mold jacket, which causes an expansion of the rubber sleeve, the concrete mass being thereby compressed from inside against the outer mold. At the compression of the concrete mass excess water and air is expelled from it through a large number of holes in the jacket wall of the outer mold, and to an insignificant extent also through the longitudinal joints between the parts of the outer mold. The pressure is also transferred from the concrete mass to the annular reinforcement embedded therein whereby prestress is imparted to this reinforcement. The amount of this prestress can be adjusted as desired by varying the water pressure. The outer mold takes up a part of the entire pressure corresponding to the opposing force of the resilient boltings.

It will be easily understood, that the layer of concrete mass inside the annular reinforcement will be subjected to the full water pressure, while the layer outside the annular reinforcement will be exposed only to the last-mentioned, considerably smaller part of the total pressure. This may cause the excess water and air, at the compression of the concrete, to be driven away from the first-mentioned layer of the concrete mass through the layer outside the annular reinforcement and out through the holes in the outer mold. Under unfavourable conditions there may be retained in the layer outside the annular reinforcement, because of the lower pressure in said layer, some excess water and air which at the setting of the concrete may create pores or channels in said layer and particularly in the immediate proximity to the annular reinforcement. Such pores or channels deteriorate the strength of the pipes and their tightness to high inner pressures.

The fact that the outer mold in the mold assembly according to U.S. Patent No. 2,865,078 must be perforated—in such an assembly for the manufacture of pipes of 900 mm. inner diameter and 5 m. length there are required for instance about 2500 holes in the outer mold—to make for a sufficient discharge area for the excess water, involves a high manufacturing cost for the outer mold and also an increase in the manufacturing cost for the concrete pipes, inasmuch as the holes must be cleaned and covered at the inside with a special water-permeable tape prior to each casting operation.

It has also been found that the expansion of the outer mold under the pressure on the concrete generated by the expansion of the inner mold sleeve can be impeded to a certain extent, or become irregular, because of frictional forces to which the outer mold is subjected. First, frictional forces may appear in the resilient boltings holding the outer mold parts together, and by varying from one bolting to another said frictional forces may cause the compressing pressure to be irregularly distributed on the concrete, which results in a pipe product the annular reinforcement of which is irregularly prestressed. Second, frictional forces normally are active between the ends of the outer mold parts and annular end rings, abutting said parts, in which rings the longitudinal reinforcement rods are secured and which are held pressed against the ends of the outer mold by the prestressing force in these reinforcement rods. These frictional forces tend to impede the expansion of the outer mold adjacent the ends thereof, and thus cause too low an amount of prestress in the adjoining annular reinforcement rods. Finally, there is friction between the concrete mass and the annular reinforcement, and because it is not uniform throughout said friction may give rise to an irregular prestressing force in the annular reinforcement rods.

The method according to the invention eliminates all the above-mentioned disadvantages that may have occurred hitherto in using the mold assembly shown in FIGURE 1. This novel method is characterized by subjecting the concrete, after the compression thereof has been completed and the annular reinforcement has reached a predetermined full amount of prestress, to vibrations of such a strength and duration, under maintained fluid pressure, that pores, channels and cracks which have a tendency of forming in the concrete during the compression thereof are removed and frictional forces which tend to impede the expansion of the outer mold and/or to cause an irregular prestressing of the annular reinforcement are partially made ineffective. Same as during the casting operation with the use of the mold assembly described and shown in U.S. Patent No. 2,865,078, the vibrations are produced by vibrating the entire mold for instance by means of vibrators (not shown) placed on the outside of the outer mold of FIG. 1.

By vibrating the concrete after the compression thereof one succeeds not only in removing such small pores and channels as may form in the concrete when using a perforated outer mold, but also in eliminating the by far more extensive pore and channel structure arising in the concrete and primarily in the outer layer thereof when the concrete is compressed against a non-perforated outer mold in which the only outlet for the excess water is by way of longitudinal joints of the outer mold. The after-vibration, as a matter of fact, is a pre-requisite for the use of a non-perforated outer mold. The pores and channels formed in the concrete at the expulsion of the excess water and air during compression are closed entirely at the after-vibration. As a consequence, it is gained by the invention not only that a concrete of better quality and higher strength is obtained but also that a considerable saving can be made by using a non-perforated outer mold. It is easily realized that the after-vibration also contributes to reducing the above-mentioned frictional forces and consequently to imparting a more regular prestress to the annular reinforcement. Moreover, the after-vibration affords the advantage that frictional cracks, if any, in the outside layer will close. Such cracks tend to form primarily adjacent the longitudinal joints of the outer mold where the movement between the outer mold and the concrete is greatest.

The duration of the after-vibration is mainly dependent on the strength of the vibrations (the number and size of the vibrators used) and the frequency thereof as well as on the concrete quality employed and the dimensions of the concrete pipe. The duration is determined by practical experiments in that the after-vibration is allowed to proceed at least for the time required for obtaining a homogeneous concrete (i.e. free from pores and channels) and at most for a time limited by the requirement that the concrete shall not flow outwards through the interstices between the annular reinforcement rods. Owing to the said frictional forces being made partly ineffective a certain pressure drop is produced in the concrete during the after-vibration. This pressure drop is compensated afterwards by adjustment of the fluid pressure to the desired value.

As an example of how to carry out the above-mentioned after-vibration, at the manufacture of pipes having an inner diameter of 900 mm. and a structural length (total pipe length minus the length of the socket in the case of socket pipes) of 5 m., when applying a compressing pressure in the inner mold that after a period not lower than 5 minutes may amount to a value of 30 atmospheres gauge pressure, one may use two high frequency vibrators having a centrifugal force of about 1000 kg. each and let the vibration proceed for a time not exceeding 60 seconds, i.e. a short time as compared with that required for building up the compressing pressure on the concrete; the pressure drop must not exceed 1 kg. per sq. cm., and expansion of the outer mold peripherally due to the after-vibration must not take place to any appreciable extent as compared with that occurring during the application of the compressing pressure on the concrete. The pressure drop is to be compensated by a readjustment of the compressing pressure to that prevailing prior to the after-vibration.

In FIG. 2 the concrete is shown compacted but not yet compressed within the mold cavity, the expansible rubber sleeve of the inner mold tightly fitting around the rigid tubular core. In FIG. 3, on the other hand, the rubber sleeve is shown expanded and the concrete compressed. The after-vibration described and claimed in this application is performed with the assembly in the condition shown in FIG 3.

While a preferred mode of carrying the method of the present invention into effect has been described in detail, it will be understood that the invention is not to be considered limited to this specific mode but should be construed to include all modifications that fall within the true spirit of the same.

What I claim and desire to secure by Letters Patent is:

In a method for manufacturing pipes of concrete having prestressed longitudinal and annular reinforcements by the use of a mold assembly having an expansible outer mold and an inner mold, at least an outer element of which consists of a flexible sleeve, said outer mold having prestressed longitudinal reinforcements and annular reinforcements mounted therein, the steps of introducing and compacting concrete within said outer mold to embed said longitudinal and annular reinforcements therein, compressing the concrete radially against the expansible outer mold by supplying fluid under pressure within said inner mold sleeve to cause said sleeve to expand, the concrete while being compressed imparting prestress to the annular reinforcement and causing expansion of the outer mold, and subjecting the concrete, after the concrete has been compressed to a sufficient extent and the annular reinforcement has assumed a predetermined full amount of prestress, and while the fluid within said inner mold sleeve is maintained under full pressure, to vibrations of adequate strength and for a period of time at its longest which ends just prior to the time at which the outer mold undergoes further expansion, in order to remove pores, channels and cracks having a tendency to form in the concrete during the compression thereof and to make frictional forces occurring in the mold assembly ineffective.

References Cited in the file of this patent

UNITED STATES PATENTS

| | | |
|---|---|---|
| 2,048,253 | Freyssinet | July 21, 1936 |
| 2,311,358 | Baily | Feb. 16, 1943 |
| 2,579,801 | Crom et al. | Dec. 25, 1951 |
| 2,582,751 | Fitzpatrick | Jan. 15, 1952 |
| 2,709,845 | Serkin | June 7, 1955 |

FOREIGN PATENTS

| | | |
|---|---|---|
| 1,113,484 | France | Dec. 5, 1955 |